United States Patent [19]
Babcock et al.

[11] Patent Number: 5,898,106
[45] Date of Patent: Apr. 27, 1999

[54] METHOD AND APPARATUS FOR OBTAINING IMPROVED VERTICAL METROLOGY MEASUREMENTS

[75] Inventors: Kenneth L. Babcock; Virgil B. Elings; John A. Gurley; Kevin Kjoller, all of Santa Barbara, Calif.

[73] Assignee: Digital Instruments, Inc., Santa Barbara, Calif.

[21] Appl. No.: 08/937,494

[22] Filed: Sep. 25, 1997

[51] Int. Cl.$^6$ .................................................. G01B 7/34
[52] U.S. Cl. ............................................ 73/105; 73/1.89
[58] Field of Search ................... 73/1.89, 105; 250/306, 250/307

[56] References Cited

U.S. PATENT DOCUMENTS 5,283,630  2/1994  Yoshizumi ............................. 356/376
5,308,974  5/1994  Elings et al. ........................... 250/234

OTHER PUBLICATIONS

Pole Tip Recession Measurements on Thin Film Heads Using Optical Profilometry With Phase Correction and Atomic Force Microscopy, M. Smallen, J. Lee; Transactions of the ASME, vol. 115, Jul. 1993.

Pole Tip Recession: Investigation of Factors Affecting Its Measurement and Its Variation With Contact Start–Stop and Constant Speed Drag Testing, C. Nadimpalli, F. Talke, M. Smallen and J. Lee; Transactions of the ASME; vol. 117, Oct. 1995.

Measuring Pole–Tip Recession in MR Heads; A. Mathai, J. See, J. Schneir, and J. Donnelly, Data Storage, Sep. 1997.

*Primary Examiner*—Daniel S. Larkin
*Attorney, Agent, or Firm*—Nilles & Nilles, S.C.

[57] ABSTRACT

A probe-based surface characterization or metrology instrument such as a scanning probe microscope (SPM) or a profilometer is controlled to account for errors in the vertical positioning of its probe and errors in detecting the vertical position of its probe while scanning over relatively large lateral distances. Accounting for these errors significantly improves the measurement of vertical dimensions. These errors are accounted for by subtracting reference scan data acquired from the scanned sample from measurement scan data. The measurement scan data is obtained from an area that includes the feature of interest as well as a portion of a reference area which is preferably located near to the feature of interest and which is preferably featureless. The reference scan data is obtained from an area that includes the reference area and that preferably excludes the features of interest. Subtracting the reference such data from the measurement scan data obtains corrected measurement scan data that accounts for scanning errors and for errors in detecting the probe idiosyncrasies. In order to facilitate process automation, the features of interest can be identified automatically or semi-automatically by operating the instrument in a feature-locating mode to identify distinguishing characteristics of the features of interest such as differences in magnetic or electrical properties between the features of interest and the adjacent features. This procedure is particularly wellsuited for measuring pole tip recession in a magnetic head.

68 Claims, 8 Drawing Sheets

METHOD AND APPARATUS FOR OBTAINING IMPROVED VERTICAL METROLOGY MEASUREMENTS

BACKGROUND OF THE INVENTION

1. Field of the Invention

The present invention relates generally to probe-based surface characterization and metrology instruments such as scanning probe microscopes (SPMs), and more particularly to an apparatus and method for improving metrology measurements of vertical dimensions by accounting for errors inherent in the scanning action of such instruments. The invention is particularly well suited for measuring pole tip recession on magnetic reading and/or writing heads.

2. Discussion of the Related Art

The present invention is relevant to measurements of the heights of features relative to a plane or surface whose area may be large with respect to the features or which may be a relatively large distance away from the features. These measurements, which will be referred to as "vertical metrology" measurements, must be performed with high accuracy for the successful development and manufacture of many modern devices such as data storage devices and semiconductor devices which must be manufactured to exacting tolerances to meet goals for data capacity with minimum expense. Precise vertical metrology measurements are required if the manufacturer is to be assured that these exacting tolerances are being maintained.

An important example of a vertical metrology measurement is the measurement of the recession of the pole tips of a recording head of a hard disk drive. The pole tips are the portions of the sensing or read/write element of the recording head which interface magnetically with the recording medium. During operation, it is desirable to minimize the spacing between the pole tips and the magnetic layer of the hard disk, thereby maximizing the signal-to-noise ratio obtained from the read element and the areal density of the data that can be written to the disk.

This spacing is in part determined by the "flying height" of the recording head, defined as the distance between the "slider", or body, of the recording head and the hard disk during operation. The nominal flying height $H_{NOM}$ of the recording head is determined by the "air bearing surface" (ABS) of the slider on which the read/write element is mounted. The modern trend in hard drive design is to reduce the flying height as much as possible, thereby bringing the pole tips closer to the medium and improving performance. Flying heights have decreased over the years from 100 nm or more to a current value of about 25 nm, and are expected to drop into the sub-nanometer range in future generations.

Another factor contributing to the spacing between the pole tips and the recording medium is the "pole tip recession" (PTR). On most recording head sliders, the pole tips are positioned laterally several microns behind the ABS, toward the trailing edge of the slider. Pole tip recession (PTR) is defined as the height difference between the ABS and the exposed surface of the pole tips. The pole tips usually are recessed with respect to the ABS, which positions them further from the hard disk during operation. This leads to an effective flying height $H_{EFF}$ which is greater than the nominal flying height $H_{NOM}$. Manufacturers are 1) seeking to minimize pole tip recession so as to keep the pole tips as close as possible to the disk, thereby optimizing performance, while 2) seeking to assure that the pole tips are in fact slightly recessed so as to prevent damage to the pole tips in the event of slider contact with the disk. Pole tip recession historically has been smaller than the nominal flying height, but is becoming more significant as flying heights shrink.

Pole tip recession occurs because the ABS and the pole tips of the read/write element wear differently during polishing and other manufacturing processes due to differences in hardness between the slider and the pole tips. The ABS typically consists of a relatively hard ceramic material (such as $Al_2O_3$—TiC), whereas the pole tips are made of a much softer permalloy (such as Ni—Fe) surrounded by a sputtered alumina. The soft pole tips therefore wear more than the hard ABS during polishing and other manufacturing operations, resulting in pole tip recession.

While recession of the pole tips occurs naturally during these processes, maintaining the necessary tight tolerances for PTR and other characteristics requires stringent process control. This in turn relies on obtaining precise and accurate measurements of PTR. Today's data density goals require measurements of PTR to an accuracy and repeatability of about 1 nm for development and process control. It may also be desirable to measure other characteristics of the pole tips, an example being surface roughness.

Previously, pole tip recession has been measured with optical instruments such as optical profilers or interference microscopes (interferometers). One such instrument is a 3D surface profiler manufactured by Zygo Corporation under the name "MAXIM GP." This instrument combines phase measuring interferometry and optical microscopy to generate 3D surface profiles. Incoming light is split inside the interferometer of the instrument so that one beam goes to an internal reference surface and the other to the sample. The reflected beams recombine inside the interferometer, undergo constructive and destructive interference, and produce the light and dark fringe pattern common to interferometers.

Optical instruments such as interferometers provide repeatable measurements of the heights of pole tips and other features as discussed, for example, in 1) Nadimpalli, "Pole Tip Recession: Investigation of Factors Affecting its Measurement and its Variation with Contact Start-Stop and Constant Speed Drag Testing", *Transactions of the ASME*, Vol. 117, October 1995 and 2) Smallen "Pole Tip Recession Measurements on Thin Film Heads Using Optical Profilometry with Phase Correction and Atomic Force Microscopy", Transactions of the ASME; Vol. 115, July 1993. However, their images suffer offsets due the differences of materials within the sample. For example, the Ni—Fe alloy of the pole tips of a typical recording head will introduce a phase shift in the optical wavefront that is different from that produced by the surrounding sputtered alumina substrate material. This phase shift difference results in a spurious offset of up to several nanometers in the apparent height of the pole tips. Similar offsets are introduced by thin coatings of substances such as synthetic diamond which are often applied to the recording head to improve wear characteristics. These offsets can be corrected mathematically or empirically to an extent, but not with the precision (on the order of 1 nanometer) demanded by manufacturers of modern recording heads. Obtaining vertical metrology measurements with the accuracy required for recording heads and other modern devices therefore is difficult using optical instruments such as interferometers.

Another disadvantage of interference microscopes and other optical instruments is that their lateral resolution is limited by the diffraction of light (typically about 500 nanometers). This resolution is not sufficient for accurate measurement of the smallest features in the latest and future generations of recording devices. For example, pole tips on recording heads are expected to reach sub-micron lateral dimensions in the near future. In addition, magneto resistive sensors used on some recording heads are so narrow (on the order of 100 nanometers wide or less) that they typically cannot be detected by interference microscopes.

SPMs recently have been used for metrology measurements on data storage devices; semiconductors, and other devices. An SPM includes a probe that is scanned in a raster pattern over a surface and that measures an interaction between the probe and the surface. This interaction is monitored to produce an image of a characteristic of the sample such as its surface topography.

An important class of SPM is the atomic force microscope (AFM) which is a type of SPM in which the probe is mounted on a flexible cantilever. Interactions between the probe and the sample influence the motion of the cantilever, and one or more parameters of this influence are measured to generate data representative of the sample's surface topography. AFMs can be operated in different modes including contact mode, TappingMode, and non-contact mode. In contact mode, the cantilever is not oscillated, and cantilever deflection is monitored as the probe tip is dragged over the sample surface. In TappingMode (Tapping and TappingMode are trademarks of Digital Instruments, Inc.), the cantilever is oscillated mechanically at or near its resonant frequency so that the probe tip repeatedly taps the sample surface, thus dissipating energy and reducing the probe tip's oscillation amplitude. The oscillation amplitude indicates proximity to the surface and may be used as a signal for feedback. U.S. patents relating to Tapping and TappingMode include 5,226,801, 5,412,980 and 5,519,212, by Elings et al., all of which hereby are incorporated by reference. In the non-contact mode, attractive interactions between the probe tip and the sample (commonly thought to be due to Van der Waals's forces) shift the cantilever resonance frequency when the probe tip is brought within a few nanometers of the sample surface. These shifts can be detected as changes in cantilever oscillation resonant frequency, phase, or amplitude, and used as a feedback signal for AFM control.

Whether in contact mode, TappingMode, or non-contact mode, feedback is typically used during AFM scanning to adjust the vertical position of the probe relative to the sample so as to keep the probe tip-sample interaction constant. A measurement of surface topography may then be obtained by monitoring a signal such as the voltage used to control the vertical position of the scanner. Alternatively, independent sensors may monitor the position of the tip during scanning to obtain a map of surface topography. Measurements can also be made without feedback by monitoring variations in the cantilever deflection as the probe moves over the surface. In this case, recording the cantilever motion while scanning results in an image of the surface topography in which the height data is quantitative.

AFMs are capable of ultra-high resolution mapping of surface topography with vertical resolutions less than an Angstrom and with lateral resolutions on the nanometer scale. The vertical resolution meets or surpasses optical techniques, while the lateral resolution far surpasses them. AFMs are used successfully in numerous applications for measuring surface micro-roughness and local feature sizes. At first blush, AFMs may appear to be well suited for pole tip recession measurements and other vertical metrology measurements. However, AFMs have difficulties obtaining vertical metrology measurements with high accuracy because of problems inherent in their operation.

One problem encountered when attempting to take vertical metrology measurements using an AFM arises from imperfections in the scanning motion or in the detection of the probe's motion during scanning. For example, AFM scanners typically use a piezoelectric material formed into a tube geometry with patterned electrodes to provide lateral (XY) scanning motion as well as vertical (Z) motion. As the probe tip is moved to effect a scanning operation, the scanner approximates a "pendulum" motion so that the probe tip is lifted slightly from the sample surface as it moves away from the point of scan origin. The AFM attempts to compensate for this tip lift by controlling voltages to the actuator to extend the probe towards the sample so that the tip tracks the surface. As a result of this pendulum motion and resultant feedback compensation, images of flat surfaces appear curved or "bowed." A typical magnitude of this "bowing" effect is on the order of ten nanometers vertical excursion for a fifty-micron lateral scanning motion. A similar effect may also be caused by coupling of X and Y with some Z motion due to imperfections in the piezo or other actuators. This curvature precludes the precise determination of a useful reference plane or surface, and accurate metrology measurements of very small vertical dimensions such as pole tip recession are therefore very difficult.

Other problems may be encountered when attempting vertical metrology measurements using an AFM. For instance, the piezoelectric material commonly used as the actuator for the AFM scanner typically exhibits hysteresis in its motion. The hysteresis produces a difference in the scan data between probe tip movement in one direction (e.g., left to right) in the raster scan vs. the opposite direction (right to left). Imprecision in the detection of the cantilever motion may also lead to errors in scanning. Scanners can also "age", i.e., their characteristics, including bow and hysteretic effects, can change significantly with time. These factors can also preclude accurate vertical metrology measurements. Furthermore, the repeatability of the measurements may be compromised because hysteresis and aging cause them to change with time, sample tilt, and other factors, making pre-calibration difficult at the level of accuracy needed.

Conventional techniques used to remove instrumental error typically are not successful in removing the AFM scanner errors and detection idiosyncrasies like those described above. One such conventional technique involves modeling the instrumental error as a simple mathematical function. For example, one can compute the best fit of the scan data to a theoretical surface defined by a polynomial or other simple function. Subtracting this theoretical surface from the scanning data then removes part of the scanning error. In the case of an AFM, however, the bow, hysteresis, and detection errors often are not accurately described by simple mathematical functions. Furthermore, the fitting step can be compromised by features that deviate from a smooth surface, perhaps the very features requiring measurement. Fitting and subtraction therefore do not lead to improvements in accuracy sufficient for many applications (such as measuring pole tip recession) which require an accuracy on the order of 1 mn.

Another type of attempt to correct for instrumental error uses reference subtraction. In this technique, a reference scan is made of a standard sample. A likely reference sample candidate would be one having a flat surface such as that of a cleaved or polished silicon wafer. This scan then is subtracted from all data scans of subsequent samples. See U.S. Pat. No. 5,283,630 by Yoshizumi. This technique is commonly also used with interferometers to correct for optical imperfections. In the case of the AFM, however, hysteresis leads to scanner idiosyncrasies that depend on overall sample tilt which may vary significantly from sample to sample. These errors therefore will vary from a reference sample to a new sample and from scan-to-scan. Hence, a "standard sample" does not exist, and it is not possible to remove scanning errors using standard reference subtraction.

These issues can also apply to probe-based instruments other than SPMs, which are used for surface characterization, or other forms of metrology. For example, stylus profilometers have been used to measure characteristics of recording heads and other devices. Profilometers measure surface features by scanning a stylus over a sample surface. However, profilometers typically do not use feedback for scanning, and the profilometer stylus is not as sharp as an AFM probe. As a result, profilometers typically have a resolution inferior to SPMs, a greater noise floor, and a greater force of tip-sample interaction. Profilometers have nonetheless found many uses in the manufacture of devices such as recording heads.

Profilometer data can suffer many of the same idiosyncrasies as those of SPMs discussed above. In particular, profilometer data of a flat surface can appear curved, and vertical metrology measurements such as that of PTR can be compromised. As with SPM, conventional correction techniques can fail to correct adequately for these idiosyncrasies. For this reason, the Objects, Embodiments, and Claims of this patent should be understood to apply to profilometers, and other relevant probe-based surface characterization and metrology instruments, as well as to SPMs.

Assuming an instrument such as an SPM can be made to produce adequate data for PTR or other vertical metrology measurements, an additional need of manufacturers is the automation of these measurements. Automation increases measurement throughput and minimizes operator intervention, both important considerations for high-volume production.

A number of factors must be considered for automation of SPM measurements of pole tip recession or similar vertical metrology measurements. For example, the SPM must be engaged in a precise location relative to features of interest such as pole tips. Furthermore, once the SPM data is acquired, the actual measurement results must be determined. For example, the pole tip recession can be measured from the SPM data by 1) placing cursors or masks on the image so as to encompass the pole tips, and then 2) determining the average height or other mathematical characteristics of those areas from the image data. This process requires that the pole tips be identified and that their positions relative to the scan boundaries be determined precisely, thus allowing them to be measured without operator intervention.

SPMs have evolved to include automation functions that address these automation issues. A notable example is pattern recognition, an image analysis capability that allows features of interest to be automatically located within an optical image of a sample surface or within SPM data. Pattern recognition often uses a correlation analysis to "find" features by comparing them to a previously taught model. Success typically requires unambiguous feature shapes as well as clear contrast.

Pattern recognition can be used to automate the acquisition of SPM data. Many SPMs include an optical microscope integrated with the SPM, which can thereby produce an image of the sample, and this image can be digitized. Because the material comprising the pole tips of a recording head is highly reflective, the pole tips are distinct in such an optical image. Pattern recognition can be used in conjunction with the optical image to help position the sample relative to the tip so that subsequent SPM data scan encompass features of interest. For example, prior to engaging the SPM, pattern recognition can be used in conjunction with the optical image to determine the position of the pole tips. This position can vary from sample to sample due to variations in recording head dimensions or errors in positioning the sample on the SPM stage. In response to the pattern recognition output, the stage can adjust the position of the recording head so that the SPM engages in a precise location relative to the pole tips. The scan data will then encompass the pole tips and other regions of the recording head as needed.

Another way pattern recognition can be used to automate vertical metrology is in the measurements taken on the scan data once it is acquired. In the case of PTR, pattern recognition could, in principle, locate features of interest such as pole tips within the AFM image data. Due to slight errors in sample positioning before scanning, the positions of the pole tips within the data image can shift slightly from scan to scan. Small errors of this kind can occur even when fine positioning of the sample is performed prior to scanning as discussed above. Pattern recognition could account for these shifts, and allow cursors or masks to be placed on the pole tip regions and so allow the measurement to be taken automatically. Knowledge of location of features within a data scan can also be used is to adjust the sample position so that subsequent SPM data scans are positioned accurately on the sample.

In practice, however, using pattern recognition to locate the position of the pole tips within AFM scan data is difficult. This is because the pole tip recession may be very small, resulting in weak image contrast which prevents the pole tips from appearing distinctly within the AFM image. Surface roughness, polishing scratches, and lapping debris on the recording head can further obscure the pole tips. As a result, pattern recognition has difficulty identifying and locating the pole tips within the AFM scan, and fully automated PTR measurements are difficult using AFM data alone.

OBJECTS AND SUMMARY OF THE INVENTION

An object of the invention is to correct for errors in the scanning motion and detection of a SPM, or other surface-characterization instrument, so as to allow more accurate measurement and/or comparison of vertical dimensions in regions separated by relatively large distances.

In accordance with a first aspect of the invention, this object is achieved by first performing a scan of a data region containing the features of interest using a probe-based surface-characterization instrument such as an AFM to obtain a data image. A second, or reference scan then is acquired in a different location on the same sample in a reference region that is preferably featureless. Typically, both images will contain the scanning imperfections described above. In addition, if the reference region can be selected to have the same tilt as the data region, the scanning idiosyncrasies should be very closely the same in the two scans. By subtracting the reference image from the data image, the errors due to scanning imperfections are removed, while the scan data concerning the features of interest remain unchanged. The resulting corrected image can then be analyzed, yielding much-improved accuracy in the measurement of vertical dimensions.

Another object of the invention is to identify and locate features in an SPM image that may not be easily detectable in the AFM image alone.

In accordance with another aspect of the invention, this object is obtained by performing spatially-correlated scans of the region of interest using both 1) topographical data and 2) other data such as MFM (Magnetic Force Microscopy) data. The locations of features of interest on the sample are identified in the image obtained by the MFM or similar scan. The desired metrology measurements then are performed on the topographical image obtained by the AFM data scan. This method enables automated measurement in cases where it otherwise would not be practical with AFM data alone.

Another object of the invention is to provide an improved SPM capable of performing very precise vertical metrology measurements.

In accordance with still another aspect of the invention, this object is achieved by providing a probe-based surface characterization or metrology instrument (such as an SPM) that includes a probe including a probe tip, often two, but at least one actuator assembly which effects relative movement between the probe base and a sample surface, a detector which detects the magnitude of at least one parameter of the relative movement, and a controller which is electronically coupled to the actuator assembly and to the detector. The controller is operable, in conjunction with the actuator assembly and the detector, to 1) acquire a data image concerning a portion of the sample which includes at least one feature of interest and often, but not necessarily a portion of a reference area, 2) acquire a reference image concerning a portion of the sample which contains the reference area, and 3) subtract the reference image from the data image thereby to obtain a corrected image. The controller then can take a metrology measurement on the corrected image and generate, from the metrology measurement, data indicative of the height of the feature of interest.

The instrument preferably comprises an atomic force microscope (AFM) operating in either contact mode, TappingMode, or non-contact mode.

These objects and aspects of the invention should also be understood to apply to other surface characterization and metrology instruments such as profilometers.

In order to facilitate automation of metrology measurement using, for example, an MFM or other feature locating mode, the controller preferably is further operable, in conjunction with the actuator assembly, the detector, and suitable probes, to operate the SPM in a feature-locating mode so as to acquire SPM data which maps variations in sample characteristics other than topography. This data can then be used to obtain an indication of the location, relative to the scan boundaries, of a pole tip or other feature of interest within the SPM scan data. Once the location is known, measurements can be taken on accompanying, spatially-correlated SPM data such an AFM scan. Knowledge of the feature location can also be used to position subsequent SPM data scans accurately on the sample. MFM is the preferred feature-locating mode, but any of a variety of other SPM operational modes, such as a phase measurement as described in U.S. Pat. No. 5,519,212, by Elings et al. could be used Other objects, features and advantages of the present invention will become apparent to those skilled in the art from the following detailed description and the accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout, and in which.

DETAILED DESCRIPTION OF THE PREFERRED EMBODIMENTS

1. Resume

The invention is concerned with accounting for errors in the vertical positioning of the probe of an SPM or stylus profilometer, or another probe-based surface characterization or metrology instrument suffering similar errors, and errors in detecting the vertical position of the probe while scanning over relatively large lateral distances. Accounting for these errors significantly improves the measurement of vertical dimensions. These errors are accounted for by subtracting reference scan data acquired from the scanned sample from data measurement scan data. The measurement scan data is obtained from the feature of interest, and typically, though not necessarily, is obtained from a portion of a reference area which is preferably located adjacent the feature of interest and which is preferably substantially featureless. The reference scan data is obtained from an area that includes the reference area and that preferably excludes the features of interest. Reference scan data is preferably acquired for every data acquisition, i.e., for each sample. Subtracting the reference scan data from the measurement scan data obtains corrected measurement scan data that accounts for scanning errors and probe idiosyncrasies. In order to facilitate process automation, the features of interest can be identified automatically or semi-automatically by operating the instrument in a feature-locating mode to identify distinguishing characteristics of the features of interest such as differences in magnetic or electrical properties between the features of interest and the adjacent features. This procedure is particularly well-suited for measuring pole tip recession in a magnetic head.

2. System Overview

Figure 1:
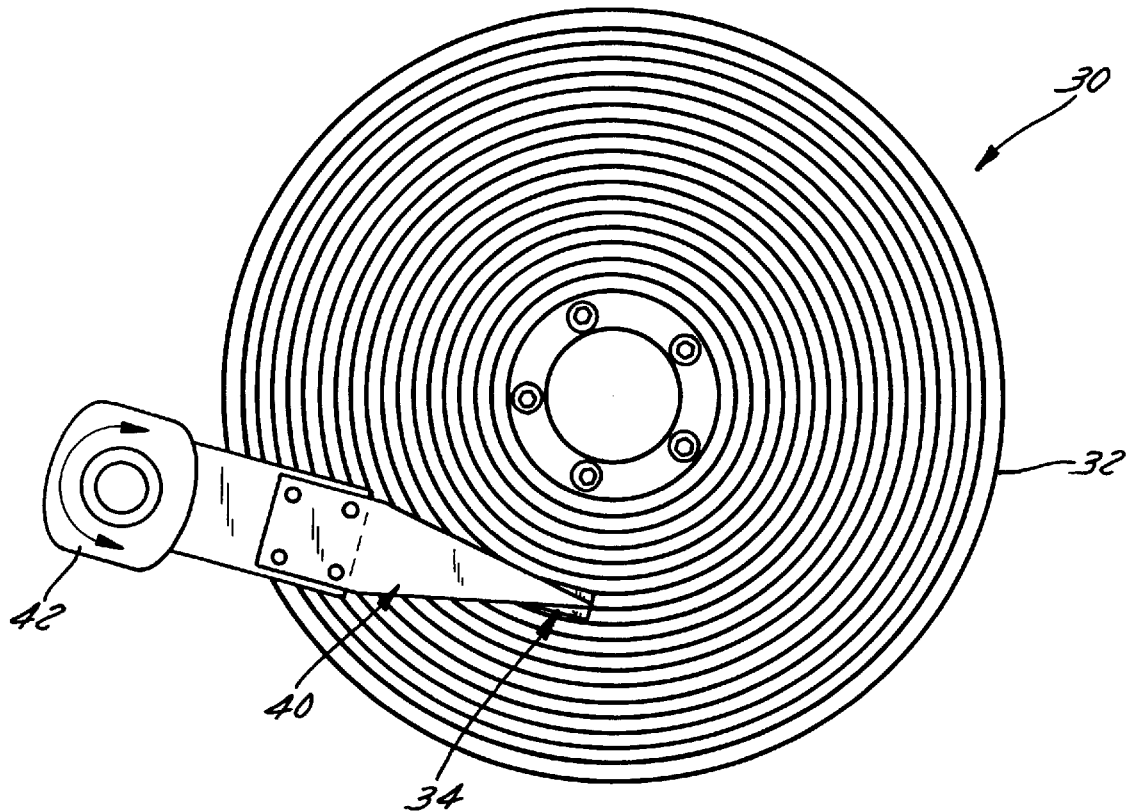
FIG. 1 is a schematic plan view of a hard disk drive to which the present invention is applicable.
Figure 2:
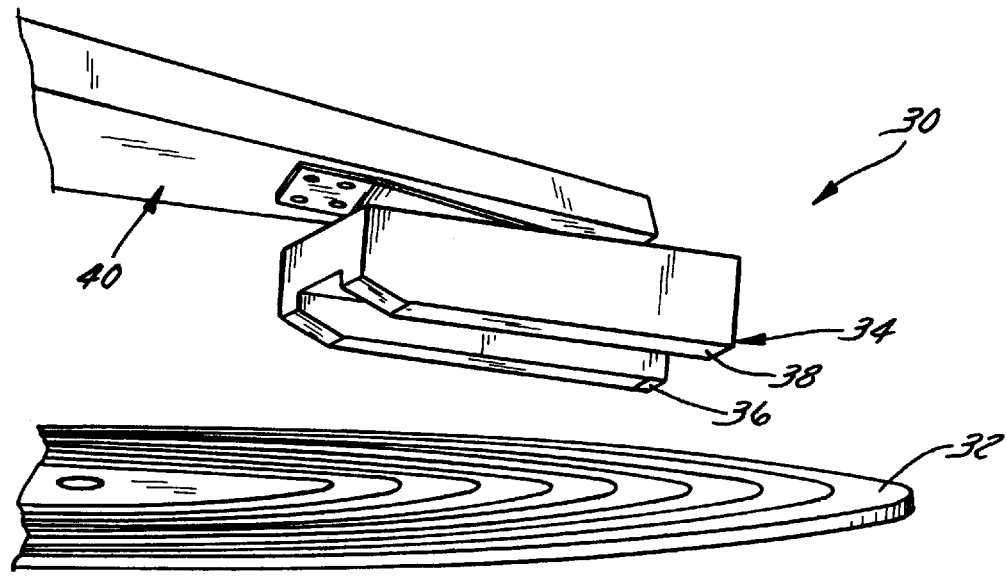
FIG. 2 is a perspective view of a portion of the hard disk drive of FIG. 1 including the magnetic recording head and the facing portion of the hard disk.

The present invention, involving the subtraction of reference scan data such as a reference image or data representative thereof from measurement scan data such as data image or data representative thereof, is applicable to virtually any application in which very precise vertical metrology measurements are desired. These applications include measuring the effects of chemical or mechanical polishing on pattern wafers, measuring the profile of a hard disk, etc. The invention is particularly well-suited for measuring pole tip recession in a recording head of a hard disk drive 30 which includes a recording head and a hard disk 32 as illustrated in FIGS. 1 and 2. The recording head comprises a slider 34 and read/write elements 36 mounted on the trailing edge of the slider adjacent to an air bearing surface (ABS) 38 of the slider 34 and facing the hard disk 32. The slider 34 is mounted on a cantilevered suspension arm 40 so that its ABS 38 remains close to the surface of the hard disk 32. The suspension arm 40 can be driven to move in parallel with the surface of the hard disk 32 by operation of a rotary actuator 42 on which the base of the suspension arm 40 is mounted.

Most of the slider surface 34 is formed from relatively hard material such as $Al_2O_3$—TiC. In the example of a magnetoresistive recording head shown in FIG. 3, the read/write elements 36 include a pair of magnetic pole tips 44, 46 (typically constructed of Ni—Fe), a thin magnetoresistive sensor 48, and a neighboring NiFe shield 50. Adjacent to these parts is a layer 52 of sputtered alumina, which abuts the ABS 38. The nominal flying height $H_{NOM}$ of the disk drive 30 is defined as the distance between the air bearing surface 38 and the surface of the disk 32. However, as discussed in the Background section above, the pole tips 44 and 46 and sensor 48 forming the operative read/write elements 36 (FIG. 2), usually are recessed with respect to the ABS 38, as best seen in FIG. 4, so that the effective flying height HEFF is somewhat greater than the nominal flying height $H_{NOM}$. The difference between the nominal flying height $H_{NOM}$ and the effective flying height $H_{EFF}$ is known as pole tip recession (PTR). The invention is well-suited for (but by no means limited to) PTR measurement.

PTR or other vertical metrology measurements can be performed in conformity with the present invention using a variety of commercially-available probe-based surface characterization or metrology instruments. A particularly suitable instrument for this purpose is an SPM such as an atomic force microscope (AFM) capable of operating in a topographical imaging mode. Topographical imaging may be performed either by operation in contact mode, TappingMode, or non-contact mode. The preferred SPM may also be capable of operating in an additional feature-locating mode, such as MFM, which can map material or other sample characteristics other than topography. Several suitable SPMs are manufactured by Digital Instruments, Inc., including those designed for production line use.

Figure 6:
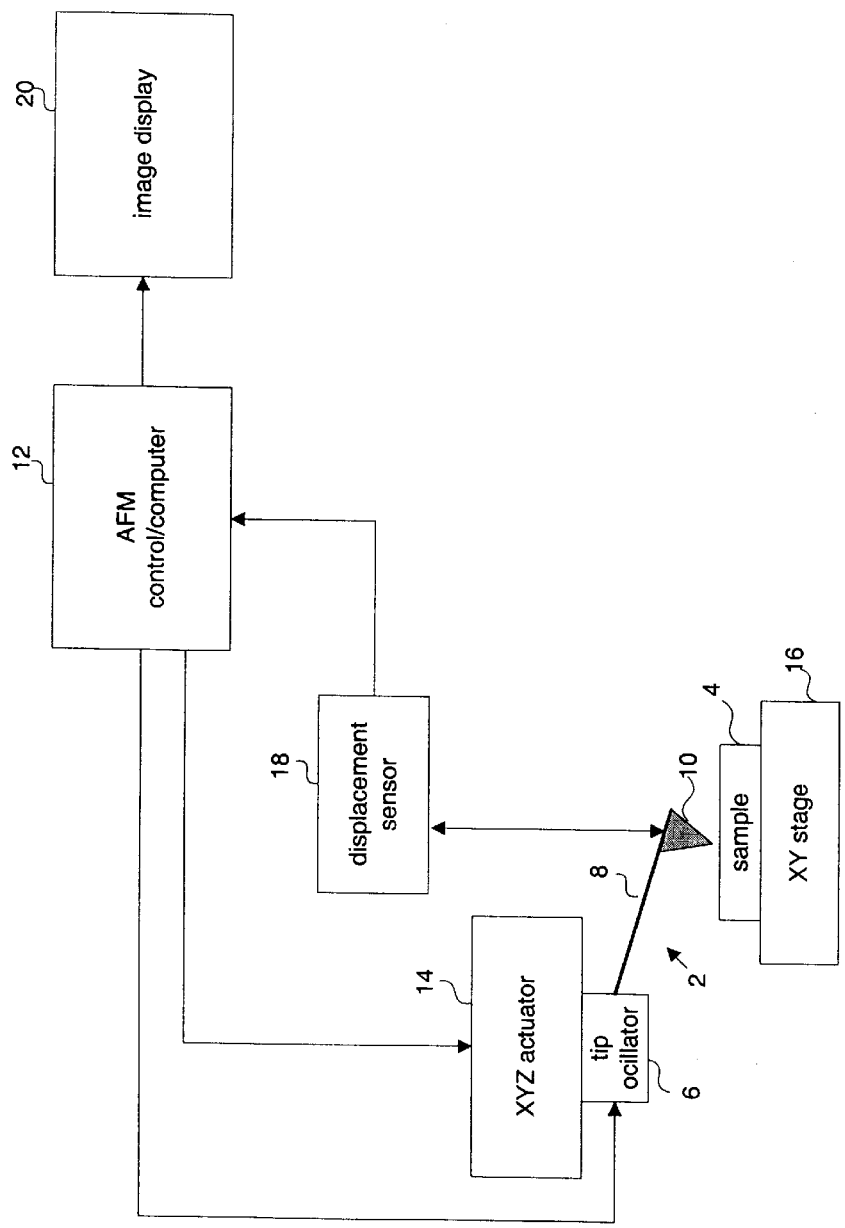
FIG. 6 is a schematic representation of an SPM to which the present invention is applicable.

Referring to FIG. 6, the AFM includes a probe 2 which scans a sample 4 (such as the pole tip region of the slider 36) by intermittent or other contact with it, or by using a "noncontact" technique. The probe 2 is oscillated by an oscillator 6, which can drive the probe 2 appropriately, usually at or near the probe's resonant frequency. The probe 2 includes a cantilever 8 having a base fixed to the oscillator 6 and a free end on which is mounted a probe tip 10. An electronic signal is applied, under control of a computer 12, from an AC signal source (not shown) to the oscillator 6 to drive the probe tip 10 to oscillate at a free oscillation amplitude $A_O$ (assuming that the AFM is operating in TappingMode). The probe 2 can also be driven towards and away from the sample 4 using a suitable actuator 14 also controlled by the computer 12. It should be noted that rather than being configured for driving the probe 2 towards the sample 4 as illustrated, the AFM could be configured for mounting the sample 4 on a movable XY stage 16 so that the XY stage can be used to translate the sample relative to the probe 2 and the actuator 14 is free to simply perform scanning motions. Probe movement is monitored by a suitable displacement sensor 18 that may for example employ a laser and photodetector as well as other components. As is known in the art, the signals from the sensor 18 can be used to determine probe oscillation amplitude, frequency, and phase, as well as other parameters, and so measure the probe-sample interaction. The computer 12 can use this measurement as a feedback signal to control the vertical probe-sample position via the actuator 14 so as to keep the probe-sample interaction constant as the actuator scans the probe laterally over the sample surface in an XY plane. In this feedback mode, the voltage or signal applied to the z (vertical) portion of the actuator is representative of the surface topography. Recording this signal as a function of scan position yields a data scan representative of the sample's surface topography. Finally, a suitable display device 20 is connected to the computer 12 and displays a humanly discernible image (such as a video image) of an output signal such as one representative of the topography of the pole tip region.

3. Basic Vertical Metrology Measurement Operation

In essence, the invention relates to the use of a probe-based instrument such as a stylus profilometer or an AFM to acquire two sets of data from each scanned sample, namely: measurement scan data and reference scan data. The invention is discussed primarily in conjunction with AFMs, which acquire data in the form of three-dimensional images, but, as discussed elsewhere herein, is also applicable to profilometers, which acquire two-dimensional data. In the case of an APM, the acquired data image typically includes the features of interest and a portion of an adjacent reference area. The reference image includes a reference area of the sample, and preferably 1) excludes the features of interest, 2) is featureless, and 3) encompasses a region equal in area to the data scan. The reference image is subtracted from the data image to obtain a corrected image so that vertical metrology measurements can be taken on the corrected image. Reference herein to "images" should be construed to encompass the generation, subtraction, or other manipulation of the actual images as well as data representative of those images. For instance, references to "image subtraction" should not be construed to require that the images actually be subtracted from one another but should instead be construed to include the subtraction of either the images themselves or the subtraction of data representative of those images.

When the vertical metrology measurement operation is applied to the AFM described above in conjunction with FIG. 6, it is performed by the AFM computer 12 using a level of input from the operator that varies with the degree of automation. The examples which follow relate to the measurement of pole tip recession, it being understood that the invention is also applicable to other vertical metrology measurements and recordings, and it also being understood that the invention is also applicable to surface characterization or metrology instruments other than SPMs.

Figure 7:
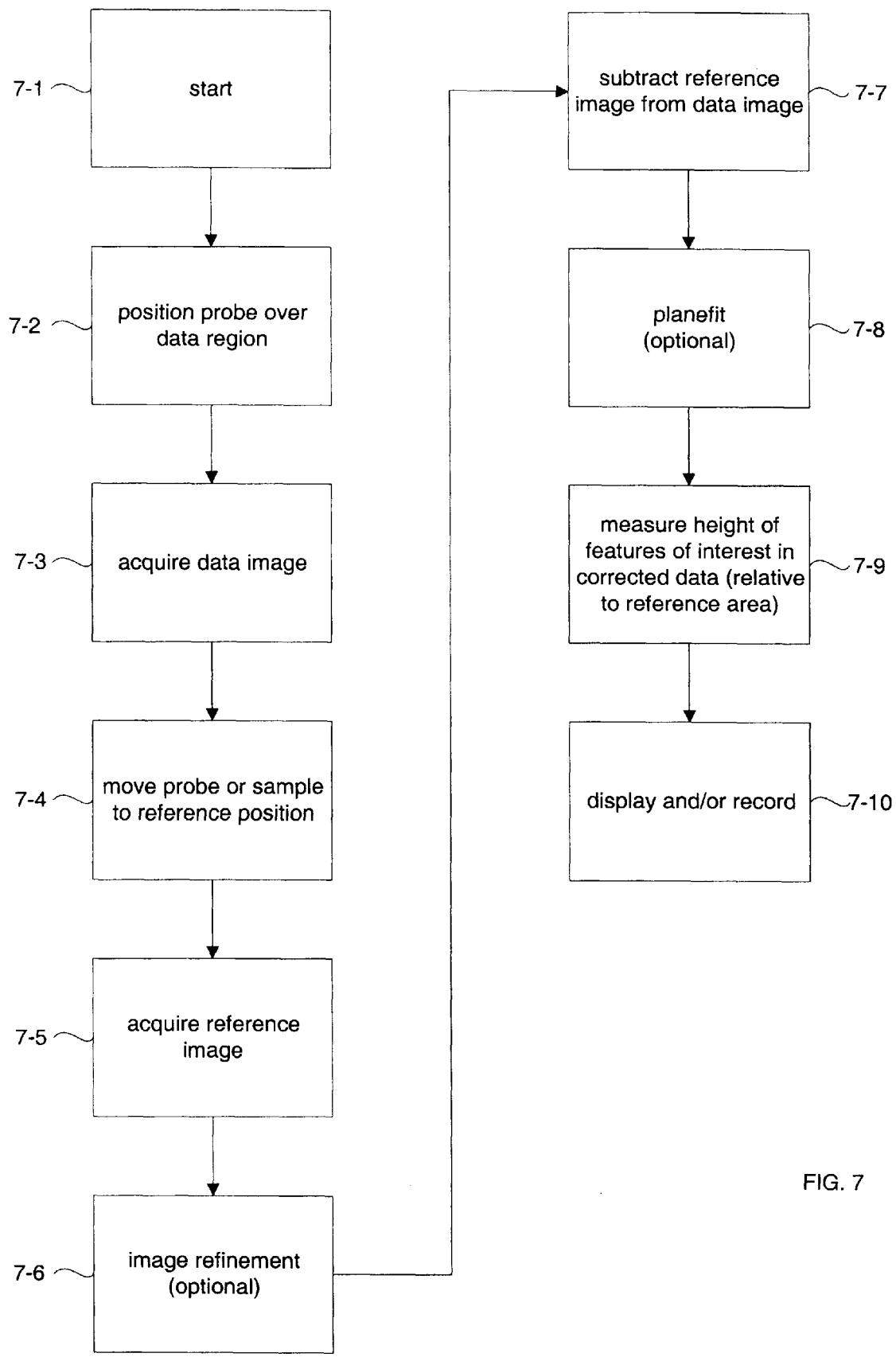
FIG. 7 is a flowchart of a vertical metrology operation performable by the SPM of FIG. 6 in accordance with a first embodiment of the invention in which surface features of interest are not located automatically by operating the SPM in a feature-locating mode.

Referring to FIG. 7, the vertical metrology measurement of PTR proceeds from start in Step 7-1 to Step 7-2 in which the probe 2 is positioned over a "data region" of the recording head slider 34. This data region preferably includes at least 1) the portion of the read/write elements 36, including the pole tips 44 and 46, sensor 48, or other features of interest, and ordinarily, but not necessarily 2) a portion of the ABS 38 located adjacent to the read/write element 36. The data region is indicated by the area hatched by lines of positive slope in FIG. 3. A topographical data image of the data region is then acquired in Step 7-3 by operating the AFM over the data region in any of the topographical modes known to the art. The profile of the image acquired during this process is often curved or bowed or has other distortions as can be seen by the curve 60 in FIG. 10 due to scanner idiosyncrasies, hysteresis, and other scanning defects discussed in the "Background" section above.

Figure 10:
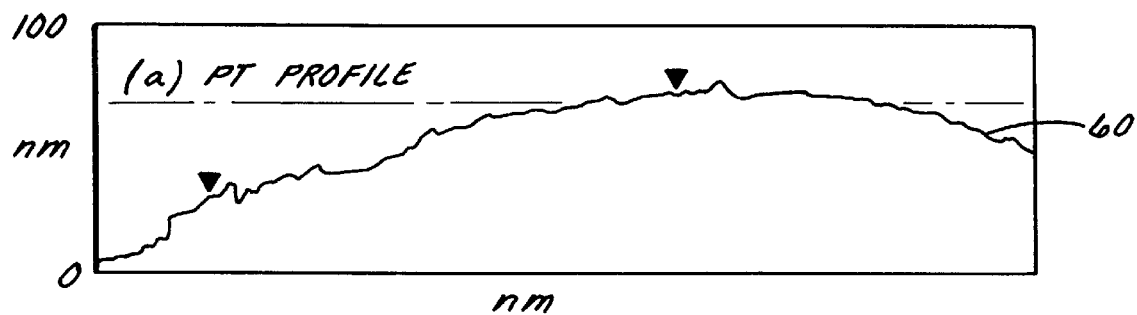
FIG. 10 is a graph illustrating the profile of an image produced by an AFM data scan of a sample in accordance with the present invention.

A reference image then is acquired to permit image subtraction thereby to account for the errors resulting in the bowed image profile illustrated in FIG. 10. Specifically, in Step 7-4, relative motion between the probe 2 and sample 4, is created such that the probe 2 is in a reference position over a reference region of the surface 38 that typically 1) includes the ABS 38, 2) excludes the pole tips 44 and 46, sensor 48, and other features of interest, and 3) is featureless as much as possible.

Figure 3:
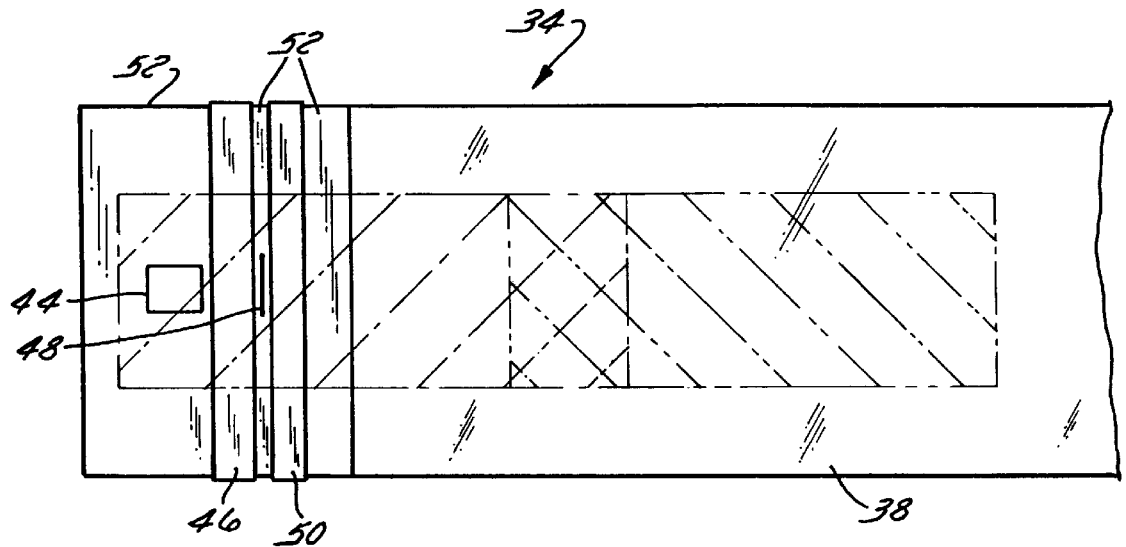
FIG. 3 is a schematic plan view of a portion of a magneto resistive recording head such as that of FIGS. 1 and 2 and illustrating in hatched areas the areas scanned during a data scan operation and a reference scan operation, respectively.
Figure 4:
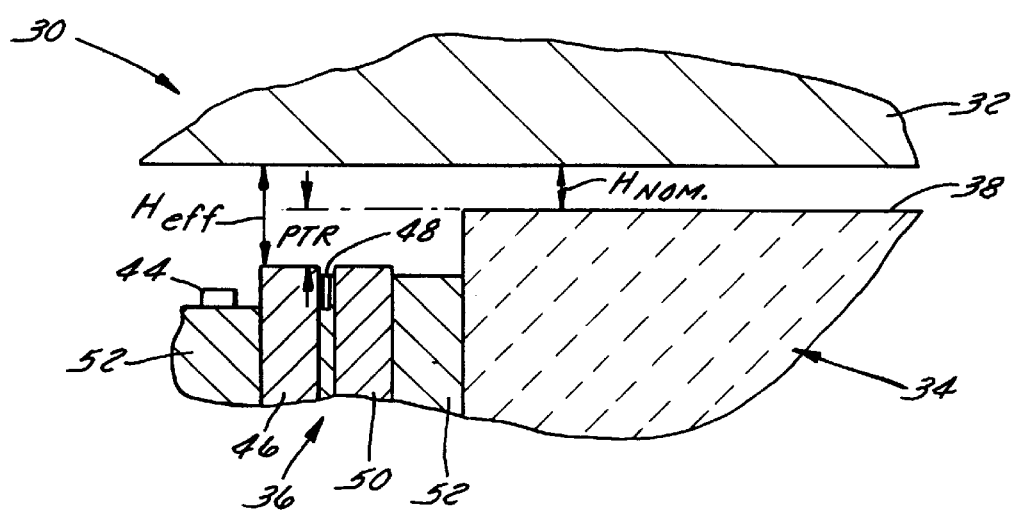
FIG. 4 is a sectional elevation view of an interface between the recording head of FIGS. 1–3 and the hard disk and illustrating the nominal flying height $H_{NOM}$, the effective flying height $H_{EFF}$, and the pole tip recession PTR.
Figure 11:
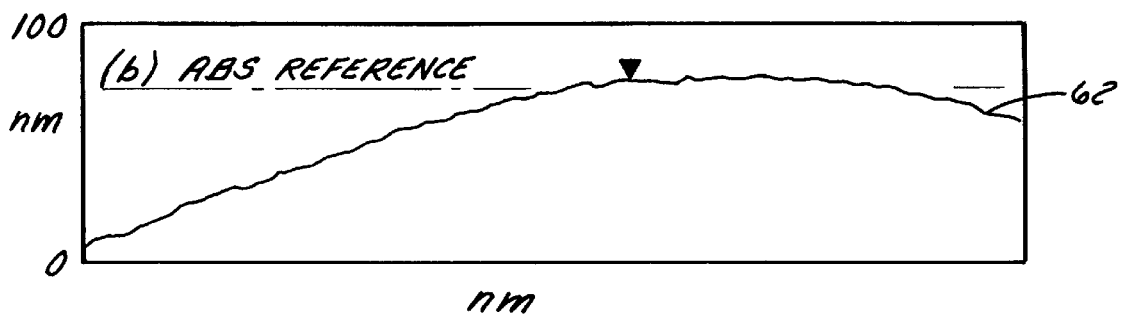
FIG. 11 is a graph illustrating the profile of an image produced by an AFM reference scan of a sample in accordance with the present invention.

The reference region is indicated by the area hatched by lines of negative slope in FIG. 3. This reference scan area or reference region may, but need not, overlap the data scan area or data region by some amount as seen in FIG. 3. Such overlap may be useful to relate the two scans in position or other parameters. The reference region should be located as close as reasonably possible to the data region so that tilt, surface curvature and other surface characteristics that may vary across the ABS 38 are as consistent as possible between the two regions. The reference region should preferably, but need not, encompass an area equal in size to the data region. A topographical reference image is then acquired in step 7-5 by scanning the probe 2 over the surface of the reference region in a raster-scan pattern while operating the probe in TappingMode. The profile of a reference image produced by this scan is illustrated by the curve 62 of FIG. 11 and takes on a curved or bowed profile due to a hysteretic effect and other scanning errors. The components of this curve resulting from scanner idiosyncrasies, hysteretic effects and other scanning errors rather than differences in actual surface profile are the same or nearly the same as corresponding components of the curve 60 of FIG. 10. As noted above, the sample 4 may be moved relative to probe 2 by XY stage 16. This can be important in some cases to ensure that the scanner idiosyncrasies, hysteretic effects and other errors are repeated as accurately as possible in the reference scan. To ensure such repetition in the case of a piezoelectric scanner, for instance, the scanner should not perform anything but the scan and the scan parameters should be as similar as possible to the prior scan, so the XY stage 16 should be used to move the sample such that the scanner goes from the data region to the reference region, or vice versa. In this manner, in the preferred case, the scanner is operated in the same manner for both areas and translation between the areas is performed by moving the sample or the entire scanner, not by applying an offset to the scanner.

After the reference and data images are acquired, they may, if desired, be refined as shown in Step 7-6 in preparation for the subsequent subtraction operation. For example, they may be flattened, using any of a variety of well-known flattening techniques, in order to remove offsets in the scan data along the "slow" scan direction caused by scanner drift due to thermal variations, bad scanlines, or other effects. Flattening is preferably performed on the so-called zeroth order so as to remove variations in the z offset between scan lines by, for example, subtracting the average z value from the selected segment from every point in the scan line. "First order" flattening may also be used to remove both the offset and slope from each scanline. (In the case of the data image, flattening is best done using only the portion of the data corresponding to the reference area. Excluding the read/write elements 36 from the data used in the flattening operation prevents actual height deviations of interest in the sample from being suppressed by the flattening operation or from adversely influencing the flattening operation.) In the case of the reference image, the entire profile curve 62 is subjected to the flattening operation unless any foreign particles such as dirt are noted on the image that may adversely affect the flattening operation, in which case the portions of the surface bearing these foreign particles will be excluded from the procedure.

Figure 12:
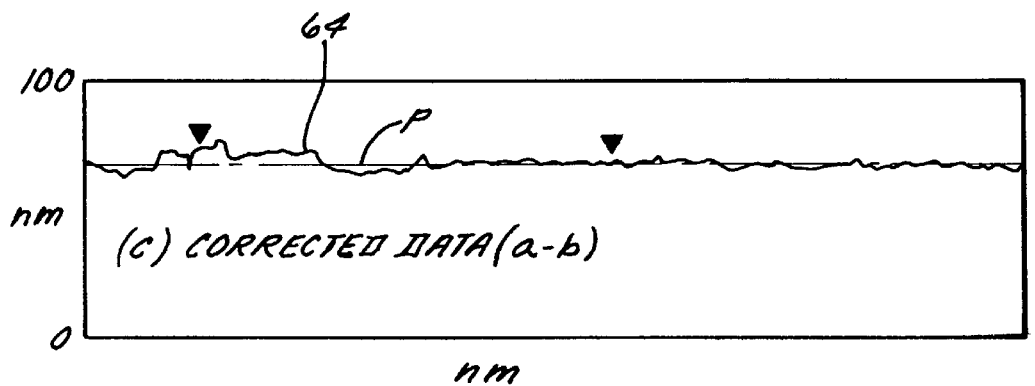
FIG. 12 is a graph illustrating the profile of a corrected image produced in accordance with the present invention.

Next, the reference image is subtracted from the data image in Step 7—7, thereby removing the effects of scanner idiosyncrasies and hysteresis, etc. from the data image and obtaining a corrected image having a generally flat profile curve as exemplified by the curve 64 in FIG. 12. The fine surface features of the reference image may be superimposed on the data image at this time. If the ABS surface roughness is significant, the reference image can be filtered prior to image subtraction using a conventional low-pass filtering operation one or several times. The corrected image profile illustrated by the curve 64 in FIG. 12 represents the actual profile of the scanned surface much more accurately than it otherwise could have been represented using a scanning probe microscope. A comparison of the raw data scan image profile in FIG. 10 with the corrected data scan image profile in FIG. 12 indicates that the uncorrected data alone would show a large recession, whereas the corrected measurement actually reveals a very slight protrusion.

In Step 7-8, the corrected image can now be adjusted to account for overall image tilt so as to facilitate subsequent metrology measurements. This step is not required, but is often desired because the entire image may appear tilted after the subtraction operation due, e.g., to inclination of the ABS surface 38 relative to the probe 2. This step may be performed using a plane fitting operation using any of a variety of known techniques. In particular, the ABS region of the corrected image is fit to a plane, and this plane is then subtracted from the image data. The result of this step is to tilt the image data so that the ABS is well approximated by a plane which is level, and to offset the image data so that this plane is at a level z=0. The resulting reference plane P is shown in cross section in FIG. 12. The corrected image now has been processed so that the heights of the various features can be measured relative to the plane P.

The heights of the features of interest now can be measured relative to the reference area in the corrected and plane-fit image in the conventional manner in Step 7-9. In the illustrated embodiment, pole tip recession is measured by measuring the height of one or both of the pole tips 44 and 46, the sensor 48, the shield 50, the alumina region 52, and any other features of interest, relative to the ABS 38 as approximated by the reference plane P. The results of this measurement can be recorded in the memory of the computer 12, combined with other information, and/or used to generate a display signal suitable for transmission to the image display device 20 for display in Step 7-10.

4. Identification of Features and their Location

The above-described example, particularly Step 7-9, assumes that the pole tips or other features of interest can be identified within the topographic image and their locations on that image can be determined. In practice, however, it usually will be necessary to identify the location on the image of the features of interest using additional data. As discussed in the Background section, this is especially true in cases where the measurement procedure is to be automated. For example, to measure the height of pole tips in an AFM image, the locations of the pole tips must be identified in relation to the surrounding material and/or in relation to the scan boundaries. Once the pole tips or other features of interest are located within the image, cursors can be positioned on the image to encompass the features of interest, and the height, roughness, and other parameters of these features can be measured.

Feature identification is particularly useful for SPM automation. SPM automation is desirable because it improves throughput and repeatability and reduces costs. As discussed in the Background section, recent generations of SPMs have many features required for automation, including pattern recognition and optical registration to allow precise location of regions of interest and to permit the SPM to engage the sample at a desired site. Pattern recognition can also be used to identify features within a data scan once it is acquired, thus allowing measurement of those features without operator intervention. Pattern recognition often uses a correlation analysis to "find" features by comparing them to a previously-taught model. Success typically requires unambiguous feature shapes as well as clear contrast.

While pattern recognition could, in principle, locate features of interest such as pole tips within a topographical imaging scan of a recording head or another sample, features of interest often have heights which are similar to heights of the surrounding areas and therefore are not sufficiently distinct in the topographical image for reliable pattern recognition. For example, clear identification of pole tips of a recording head would require that their heights differ significantly from the height of the surrounding substrate. However, recording heads often are polished so that the pole tips are close to the same height as the surrounding material. Polishing scratches, lapping debris, and other microscopic topographical features can further obscure the pole tips. Pattern recognition often fails in practice when applied directly to the AFM topographical image of pole tips.

A solution to the problem of automated feature location identification lies in mapping the material characteristics of the features being measured. The features of interest often are composed of a different material from the materials forming the surrounding features of the sample. A system which has the ability to map these variations in sample material would be capable of reliably and unambiguously identifying the features and locating the features of interest on the sample. If such a map could then be correlated with the AFM topographical data, vertical metrology and other measurements of the features could be performed precisely on the AFM topographical data.

Figure 5:
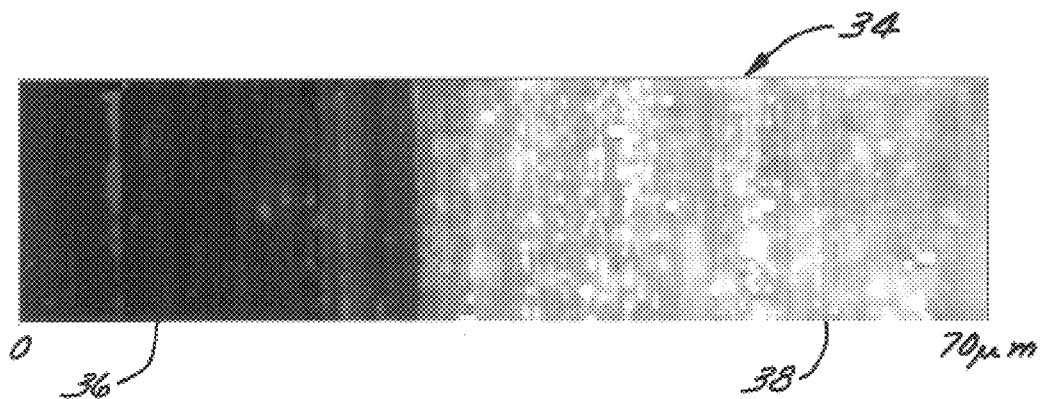
FIG. 5 corresponds to FIG. 3 and illustrates an AFM data scan image.

Forms of scanning probe microscopy are known which do in fact detect characteristics of a sample other than its topography. MFM, as mentioned above, is one of the best-known of these forms. MFM uses a magnetized probe to detect magnetic fields above a sample surface and hence is capable of detecting variations in a sample's magnetic field and of producing a magnetic topography image. It is also well known to the art to use the same SPM, and even the same probe, to perform two different types of scans on the same sample. One mode of operating the same SPM at the same location over a sample in two modes generally is referred to in the art as "Lift Mode" operation and is described in some detail in U.S. Pat. No. 5,308,974 by Elings et al. (the Elings '974 patent), the subject matter of which hereby is incorporated by reference. In Lift Mode operation, a topographic image of the type discussed in Section 2 above can be acquired, and another image also can be acquired which 1) maps variations in sample characteristics and which 2) may be used to locate features of interest. For example, the other image may comprise an electric field image as described in conjunction with FIG. 5 of the Elings '974 patent, or a magnetic image as described in conjunction with FIG. 4 of the Elings '974 patent. Other image modes are also well-known to the art, including maps of surface potential, thermal imaging, tip-sample capacitance, force modulation, phase imaging, and others.

Figure 8:
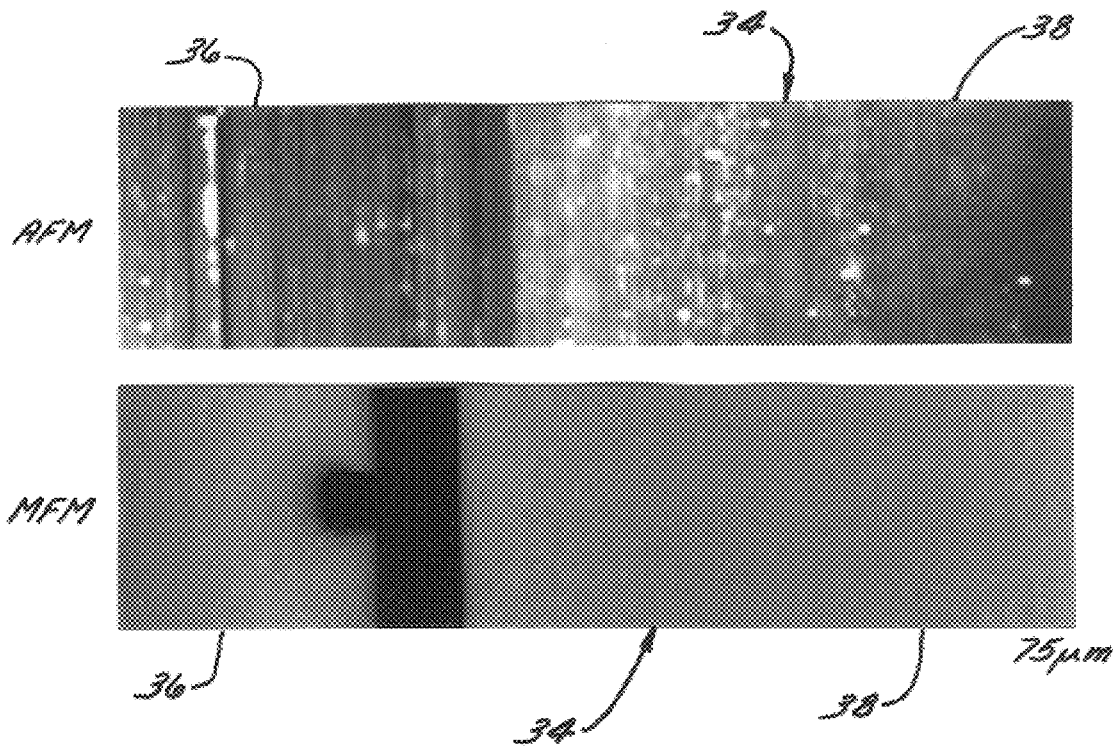
FIG. 8 illustrates a pair of SPM images in the data scan area of which the top image is an AFM data scan of a sample in accordance with the present invention and the bottom image is a feature-locating MFM image of the same area, taken simultaneously with the AFM scan.

In the case of measuring pole tip recession, advantage can be taken of the fact that pole tips typically are made of a conducting, ferromagnetic alloy such as Ni—Fe, whereas the surrounding substrate is made of a dielectric, nonmagnetic substance such as aluminum oxide. A magnetic scan over the pole tips and surrounding features therefore generates an image showing high contrast between the magnetic pole tips and the non-magnetic substrate. The contrast present in this image is better suited for pattern recognition than the topographical image produced in AFM topographical imaging made and lacking corresponding contrast. Hence, pattern recognition can be performed on an easily-contrastable image such as a magnetic image to map the surface characteristic of the scanned image, and this map then can be used to locate features in the spatially-correlated topographic image for vertical metrology measurements and other operations. An example of an AFM/topographic and MFM/magnetic image pair suitable for this process is shown in FIG. 8. Application of this process to the present invention now will be detailed.

Figure 9:
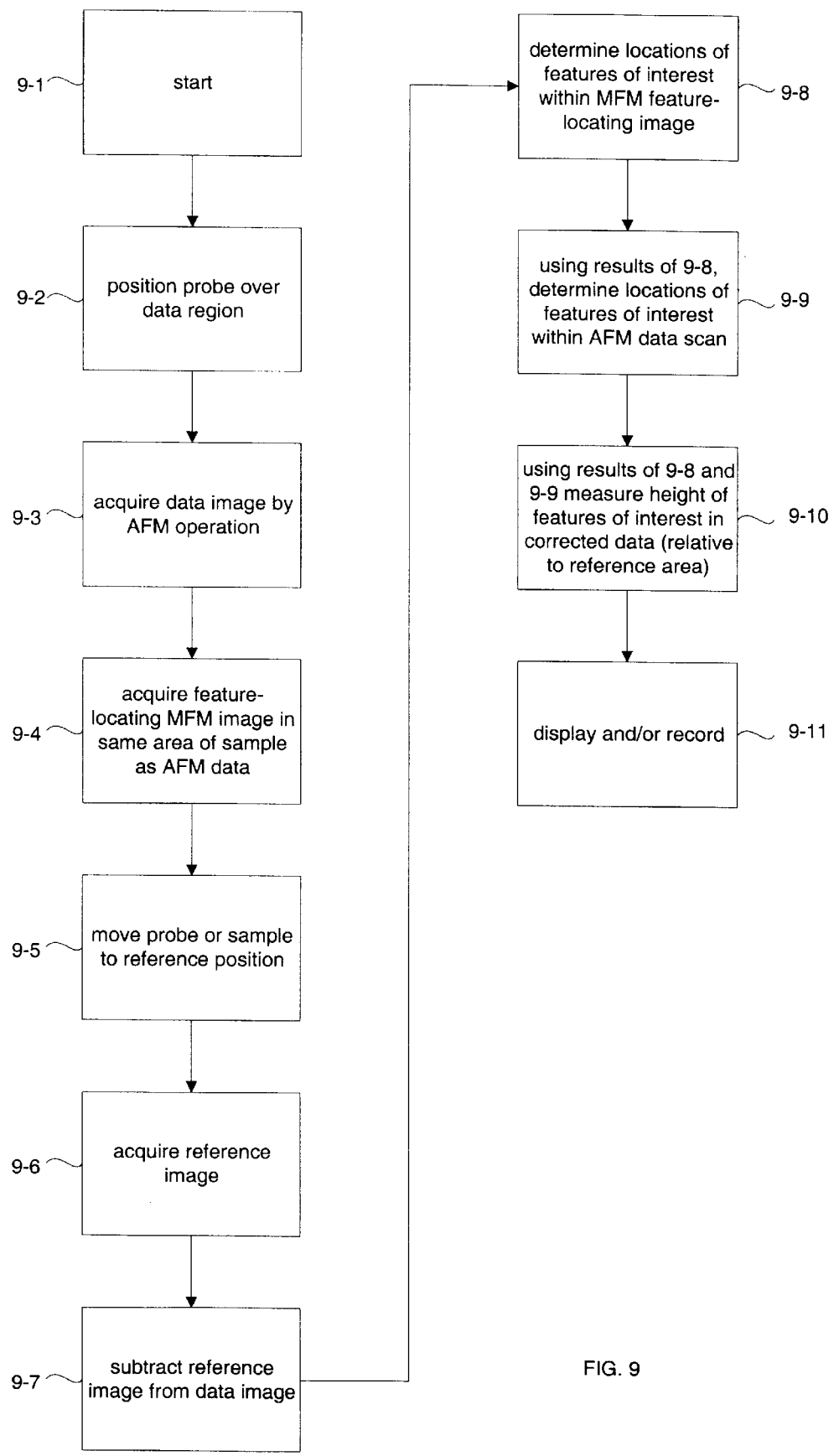
FIG. 9 is a flowchart of a vertical metrology measurement operation performed in accordance with a second embodiment of the invention in which surface features of interest are located automatically by operating the SPM in a feature-locating mode.

Referring to FIG. 9, the vertical metrology measurement operation proceeds from start in Step 9-1 to Step 9-2 in which the probe 2 is positioned over the data region of the recording head slider 34. A topographical data image of the data region then is acquired in Step 9-3 by operating the AFM in one of the topographical modes well known to the art. A feature-locating image is acquired in Step 9-4, preferably by an MFM scanning operation such as the one described in the Elings '974 patent. This MFM operation preferably occurs simultaneously with the AFM operation so that the AFM data and MFM data are spatially correlated and superimposable on each other. Acquiring the MFM image permits positional correlation of features within the AFM image. Standard pattern recognition procedures can now be applied to the MFM image to identify the positions of pole tips, shields, or other features of interest in that image relative to the scan boundaries or each other. One then knows by correlation the location of these features in the corresponding topographic AFM image.

Next, in Step 9-5, the probe 2 or sample 4 is moved to a position suitable for acquisition of a reference image, and the reference image is acquired in Step 9-6- by operating the AFM in one of the topographical modes well known to the art. The reference image is then subtracted from the data image to obtain a corrected data image in Step 9-7. In Step 9-8, the locations of features of interest are determined within the MFM feature-locating image. Using the results of Step 9-8, the locations of the features of interest within the AFM image are determined (Step 9—9). Following the discussion of FIG. 7, the corrected image may be further processed using plane fitting techniques so that the ABS is well approximated by a level plane at z=0. The height of the pole tips 44 and 46, sensor 48, shield 50, or other features of interest relative to this reference area can then be measured as in 9-10. This vertical metrology measurement is facilitated by the fact the precise locations on the slider 36 of these features is known from the image locating or mapping operation. Information produced by these measurements can then be recorded and/or displayed in Step 9-11.

Material characteristics also can be measured using SPM instruments and methods other than MFM. For example, scanning capacitance microscopy detects variations in free carrier concentration and conductivity; electric force microscopy detects electric fields; scanning potential microscopy detects variations in surface potential or surface charge density; scanning thermal microscopy detects variations in temperature or thermal conductivity; near-field optical microscopy detects variations in light reflections or transmission, force modulation as described in U.S. Pat. No. 5,237,859 by Elings et al., and phase imaging detects energy loss between the tip and surface which is material dependent. These and other scanning probe instruments can be used to map variations in material characteristics, and these maps can then be used to identify the location of specific features of interest for subsequent vertical metrology or other measurements.

The process of using one data scan produced in a certain imaging mode to locate features within a spatially-correlated data scan produced by a different imaging mode may be generalized beyond vertical metrology measurements. For example, it may be desirable to use an SPM to measure the electric potential of a certain conducting line on an integrated circuit. The conducting line may have a distinct topographical signature, whereas its potential may not be unique with respect to neighboring lines. An AFM data scan could be used to locate the line, and this information then used to make measurements on a spatially-correlated scan of surface potential. Other examples and combinations of SPM modes can also be described. The invention of using one data scan mode to locate features in a spatially-correlated scan using a different scan mode should therefore be understood to be generally applicable to various combinations of scan modes.

5. Optical Instrument Calibration

The above examples assume that pole tip recession or other vertical metrology measurements of interest will be performed on every sample using a scanning probe microscope, or other probe-based surface characterization or metrology instrument (such as a stylus profilometer) and the above-described image subtraction process. However, some users generally prefer to obtain vertical metrology measurements through optical imaging using an interferometer or the like rather than through AFM imaging because optical imaging generally is considered to be somewhat faster. However, as discussed in the "Background" section above, optical measurements are less accurate than AFM measurements because their images suffer offsets due to the differences of materials within the sample. These differences introduce a phase shift in the optical wavefront that results in a spurious offset of up to several nanometers in the apparent height of the pole tips or other features of interest. This problem can be alleviated by using an AFM or probe-based instrument measurement of the type described above to at least partially calibrate an interferometer or other optical sensor in a process illustrated in FIG. 13.

Figure 13:
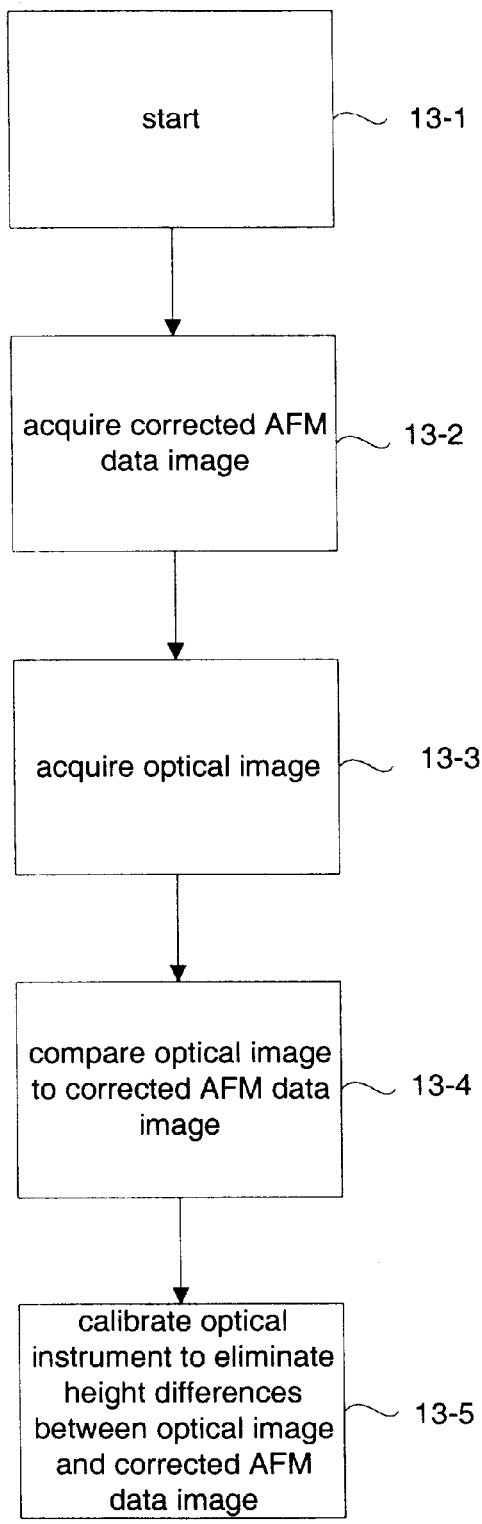
FIG. 13 is a flowchart of an optical instrument calibration procedure performed in accordance with the present invention.

The process of FIG. 13 proceeds from start in Step 13-1 to Step 13-2 where a corrected AFM data image is obtained by operating an AFM using one of the processes described in Sections 3 or 4 above. Next, in Step 13-3, an optical topographic image of the same sample is acquired using an optical instrument such as the MAXIM GP 3D surface profiler manufactured by Zygo Corporation. The profile of this optical image may include spurious offsets due to differences in materials in the various portions of the sample. This image is compared to the corrected AFM image in Step 13-4 so that the magnitudes of the spurious offsets can be ascertained. The optical instrument then can be calibrated in Step 13-5 to at least partially eliminate these offsets, thereby obtaining more accurate profile measurements in subsequent scans.

This calibration process need not be repeated for each sample so long as the properties of the constituent materials of the samples do not vary significantly from sample to sample. It is preferred, however, that the process be repeated at regular intervals to accommodate changes in instrument operation or in average sample composition. For example, the calibration process could be performed at the beginning of each day or at the beginning of measuring each batch of samples.

Many changes and modifications may be made to the present invention without departing from the spirit thereof. The scope of some of these changes is discussed above. The scope of the remaining changes will become apparent from the appended claims.

We claim:

1. A probe-based instrument, comprising:
   (A) a probe including a probe tip;
   (B) an actuator assembly which effects relative movement between said probe tip and a sample,
   (C) a detector which detects the magnitude of at least one parameter of the relative movement; and
   (D) a controller which is electronically coupled to said actuator assembly and to said detector and which is operable, in conjunction with said actuator assembly and said detector, to
      (1) acquire a data image of a portion of a sample which includes at least one feature of interest,
      (2) acquire a reference image of a portion of the sample, and (3) subtract at least part of the reference image from at least part of the data image thereby to obtain a corrected image.

2. An instrument as defined in claim 1, wherein said controller is further operable to take a metrology measurement on the corrected image and to generate, from the metrology measurement, a signal indicative of the height of the feature of interest relative to a reference plane.

3. An instrument as defined in claim 1, wherein said controller is further operable to generate a humanly-discernible signal indicative of the height of the feature of interest, and further comprising a display device which displays the humanly-discernible signal.

4. An instrument as defined in claim 1, wherein said instrument is a scanning probe microscope (SPM).

5. An instrument as defined in claim 4, wherein said instrument is an atomic force microscope (AFM).

6. An instrument as defined in claim 1, wherein said instrument is a profilometer.

7. A method of operating a probe-based instrument, comprising the steps of:
(A) operating the instrument to acquire a data image of a portion of a sample which includes at least one feature of interest;
(B) operating the instrument to acquire a reference image of a portion of the sample; and
(C) subtracting at least part of the reference image from at least part of the data image thereby to obtain a corrected image.

8. A method as defined in claim 7, further comprising taking a metrology measurement on the corrected image and generating, from the metrology measurement, a signal indicative of the height of the feature of interest relative to a reference plane.

9. A method as defined in claim 8, further comprising generating and displaying a humanly-discernible signal indicative of the height of the feature of interest.

10. A method as defined in claim 8, wherein the signal is a first height signal, and further comprising:
obtaining an optical image of a portion of the sample which contains the feature of interest using an optical instrument and generating, from the optical image, a second height signal indicative of the height of the feature of interest relative to the reference plane, and
calibrating the optical instrument by comparing the second height signal to the first height signal and, if the first and second height signals differs from one another, adjusting the optical instrument so that a height signal produced from a subsequent optical image of the feature of interest produced by the optical instrument substantially equals the first height signal.

11. A method as defined in claim 10, wherein the optical instrument is an interferometer.

12. A method as defined in claim 7, wherein:
the sample is a slider of a hard disk drive, the feature of interest is a pole tip mounted on the slider, and the reference image is an image of at least a portion of an air-bearing surface of the slider located adjacent to the pole tip, and wherein
the corrected image is an image of pole tip recession.

13. A method as defined in claim 7, wherein the instrument is a scanning probe microscope (SPM) and the acquisition steps involve scanning probe microscopy.

14. A method as defined in claim 7, wherein the instrument is an atomic force microscope (AFM) and the acquisition steps involve atomic force microscopy.

15. A method as defined in claim 7, wherein the instrument is a profilometer and the acquisition steps involve profilometery measurements.

16. A method of operating a probe-based instrument, comprising the steps of:
(A) operating the instrument to acquire measurement scan data representative of a characteristic of a portion of a sample which includes at least one feature of interest;
(B) operating He instrument to acquire reference scan data representative of a characteristic of a portion of the sample; and
(C) subtracting at least some reference scan data from at least some measurement scan data to thereby obtain corrected measurement scan data.

17. A method as defined in claim 16, further comprising obtaining a metrology measurement from the corrected measurement scan data and generating, from the metrology measurement, a signal indicative of the height of the feature of interest relative to a reference plane.

18. A method as defined in claim 17, further comprising generating and displaying a humanly-discernible signal indicative of the height of the feature of interest.

19. A method as defined in claim 17, wherein the signal is a first height signal, and further comprising:
obtaining an optical image of a portion of the sample which contains the feature of interest using an optical instrument and generating, from the optical image, a second height signal indicative of the height of the feature of interest relative to the reference plane, and
calibrating the optical instrument by comparing the second height signal to the first height signal and, if the first and second height signals differs from one another, adjusting the optical instrument so that a height signal produced from a subsequent optical image of the feature of interest produced by the optical instrument substantially equals the first height signal.

20. A method as defined in claim 19, wherein the optical instrument is an interferometer.

21. A method as defined in claim 16, wherein:
the sample is a slider of a hard disk drive, the feature of interest is a portion of a read/write element mounted on the slider, and the reference scan data is height data taken from at least a portion of an air-bearing surface of the slider located adjacent to the portion of the read/write element, and wherein:
the corrected measurement data is data representative of pole tip recession.

22. A method as defined in claim 21, further comprising operating the instrument in a feature-locating mode so as to map variations in feature characteristics and to obtain an indication of the location on the slider surface of the portion of the read/write element.

23. A method as defined in claim 22, wherein the feature-locating mode is magnetic force microscopy (MFM).

24. A method as defined in claim 16, further comprising operating the instrument in a feature-locating mode so as to obtain feature-locating data which is representative of variations in sample characteristics and which provides an indication of the location on the sample of the feature of interest.

25. A method as defined in claim 24, wherein the feawre-locating mode is magnetic force microscopy (MFM).

26. A method as defined in claim 24, wherein the measurement scan data is acquired prior to the acquisition of the reference scan data, and further comprising repositioning at least a probe of the instrument relative to the sample between the acquisition of the measurement scan data and the acquisition of the reference scan data, and wherein the step of operating the instrument in a feature-locating mode is performed prior to the repositioning step.

27. A method as defined in claim 26, wherein the feature-locating data is acquired simultaneously with the acquisition of the measurement scan data.

28. A method as defined in claim 24, further comprising repositioning the sample relative to a probe of the instrument between the acquisition of the measurement scan data and the acquisition of the reference scan data.

29. A method as defined in claim 28, wherein the operation of the probe during the acquisition of the measurement scan data is substantially identical to the operation of the probe during the acquisition of the reference scan data.

30. A method as defined in claim 16, wherein step (A) further comprises operating the instrument to acquire measurement scan data along a portion of the sample which includes a portion of the area along which reference scan data is acquired.

31. A method as defined in claim 16, wherein the measurement scan data is a data image, the reference scan data is a reference image, and the corrected measurement scan data is a corrected data image.

32. A method as defined in claim 31, wherein the instrument is a scanning probe microscope and data is obtained by scanning probe microscopy.

33. A method as defined in claim 16, wherein the instrument is a profilometer and data is obtained by profilometery.

34. A scanning probe microscope (SPM) comprising:
(A) a probe including a probe tip;
(B) an actuator assembly which effects relative movement between said probe tip and a sample surface,
(C) a detector which detects the magnitude of at least one parameter of the relative movement; and
(D) a controller which is electronically coupled to said actuator assembly and to said detector and which is operable, in conjunction with said actuator assembly and said detector, to
(1) acquire a data image of 1) a portion of a sample which includes at least one feature of interest and 2) a portion of a reference area,
(2) acquire a reference image of a portion of the sample surface which contains at least a portion of the reference area, and
(3) subtract at least part of the reference image from at least part of the data image thereby to obtain a corrected image.

35. A method of operating a scanning probe microscope (SPM), comprising the steps of:
(A) operating the SPM to acquire a data image of a portion of a sample surface which includes 1) at least one feature of interest and 2) at least a portion of a reference area;
(B) operating the SPM to acquire a reference image of a portion of the sample surface which contains at least a portion of the reference area; and
(C) subtracting at least part of the reference image from at least part of the data image to thereby obtain a corrected image.

36. A scanning probe microscope (SPM) comprising:
(A) a probe including a probe tip;
(B) an actuator assembly which effects relative movement between said probe tip and a sample,
(C) a detector which detects the magnitude of at least one parameter of the relative movement; and
(D) a controller which is electronically coupled to said actuator assembly and to said detector and which is operable, in conjunction with said actuator assembly and said detector, to
(1) acquire a data image of a portion of a sample which includes at least one feature of interest,
(2) acquire a reference image of a portion of the sample, and
(3) subtract at least part of the reference image from at least part of the data image thereby to obtain a corrected image.

37. An SPM as defined in claim 36, further comprising another actuator assembly which effects relative movement between said probe tip and the sample.

38. An SPM as defined in claim 36, wherein the controller is further operable to take a metrology measurement on the corrected image and to generate, from the metrology measurement, a signal indicative of the height of the feature of interest relative to a reference plane.

39. An SPM as defined in claim 38, wherein said controller is further operable to generate a humanly-discernible signal indicative of the height of the feature of interest, and further comprising a display device which displays the humanly-discernible signal.

40. An SPM as defined in claim 36, wherein the controller is further operable, in conjunction with said actuator assembly and said detector, to operate the SPM in a feature-locating mode so as to map variations in feature characteristics and to obtain an indication of the location on the sample of the feature of interest.

41. An SPM as defined in claim 40, wherein the feature-locating mode is magnetic force mode (MFM).

42. A method of operating a scanning probe microscope (SPM), comprising the steps of:
(A) operating the SPM to acquire a data image of a portion of a sample which includes at least one feature of interest;
(B) operating the SPM to acquire a reference image of a portion of the sample; and
(C) subtracting at least part of the reference image from at least part of the data image to thereby obtain a corrected image.

43. A method as defined in claim 42, further comprising taking a metrology measurement on the corrected image and generating, from the metrology measurement, a signal indicative of the height of the feature of interest relative to a reference plane.

44. A method as defined in claim 43, further comprising generating and displaying a humanly-discernible signal indicative of the height of the feature of interest.

45. A method as defined in claim 43, wherein the signal is a first height signal, and further comprising:
obtaining an optical image of a portion of the sample which contains the feature of interest using an optical instrument and generating, from the optical image, a second height signal indicative of the height of the feature of interest relative to the reference plane, and
calibrating the optical instrument by comparing the second height signal to the first height signal and, if the first and second height signals differ from one another, adjusting the optical instrument so that a height signal produced from a subsequent optical image of the feature of interest produced by the optical instrument substantially equals the first height signal.

46. A method as defined in claim 45, wherein the optical instrument is an interferometer.

47. A method as defined in claim 42, wherein:
the sample is a slider of a hard disk drive, the feature of interest is a portion of a read/write element mounted on the slider, and the reference image is an image of at least a portion of an air-bearing surface of the slider located adjacent to the portion of the read/write element, and wherein:
the corrected image is an image of pole tip recession.

48. A method as defined in claim 47, further comprising operating the SPM in a feature-locating mode so as to map variations in feature characteristics and to obtain an indication of the location on the slider surface of the portion of the read/write element.

49. A method as defined in claim 48, wherein the feature-locating mode is magnetic force microscopy (MFM).

50. A method as defined in claim 42, further comprising operating the SPM in a feature-locating mode so as to obtain a feature-locating image which maps variations in sample characteristics and provides an indication of the location on the sample of the feature of interest.

51. A method as defined in claim 50, wherein the feature-locating mode is magnetic force microscopy (MFM).

52. A method as defined in claim 50, wherein the data image is acquired prior to the acquisition of the reference image, and further comprising repositioning at least a probe of the SPM relative to the sample between the acquisition of the data image and the acquisition of the reference image, and wherein the step of operating the SPM in a feature-locating mode is performed prior to the repositioning step.

53. A method as defined in claim 52, wherein the feature-locating image is acquired simultaneously with the acquisition of the data image.

54. A method as defined in claim 50, further comprising repositioning the sample relative to a probe of the SPM between the acquisition of the data image and the acquisition of the reference image.

55. A method as defined in claim 54, wherein the operation of the probe during the acquisition of the data image is substantially identical to the operation of the probe during the acquisition of the reference image.

56. A method as defined in claim 42, wherein step (A) further comprises operating the SPM to acquire a data image of a portion of the sample which includes a portion of the area contained in the reference image.

57. A method of operating a scanning probe microscope (SPM), comprising the steps of:
(A) operating the SPM in a topographical scanning mode to acquire a data image of a portion of a sample which includes at least one feature of interest;
(B) operating the SPM in a feature-locating mode so as to map variations in material characteristics, thereby to obtain an indication of the location on the sample of the feature of interest;
(C) operating the SPM in the topographical scanning mode to acquire a reference image of a portion of the sample;
(D) subtracting at least part of the reference image from at least part of the data image thereby to obtain a corrected image; then
(E) taking metrology measurements on the corrected image to obtain an indication of the height of the feature of interest relative to a reference plane.

58. A method as defined in claim 57, wherein the step (A) further comprises operating the SPM to acquire a data image of a portion of the sample which includes a portion of the area contained in the reference image.

59. A method as defined in claim 57, wherein the step of operating the SPM in a feature-locating mode comprises identifying the location in the data image of a feature of interest.

60. A method of measuring pole tip recession using an scanning probe microscope (SPM), the pole tip being mounted on a slider, the method comprising the steps of:
(A) operating the SPM in a topographical imaging mode to acquire a data image of a portion of the slider surface which includes 1) the pole tip and 2) a portion of a reference area located in an air bearing surface located adjacent the pole tip;
(B) operating the SPM in a feature-locating mode so as to map variations in material characteristics, thereby to obtain an indication of the location on the slider surface of at least a portion of the pole tip;
(C) operating the SPM in the topographical imaging mode to acquire a reference image of a portion of the slider surface which includes at least a portion of the reference area and which excludes the pole tip;
(D) subtracting the reference image from the data image thereby to obtain a corrected image of the pole tip; then
(E) taking a metrology measurement on the corrected image to obtain an indication of pole tip recession.

61. A method as defined in claim 60, further comprising generating and displaying a humanly-discernible signal indicative of pole tip recession.

62. A method of measuring pole tip recession using an atomic force microscope (AFM), the pole tip being mounted on a slider, the method comprising the steps of:
(A) operating the AFM in a topographical imaging mode to acquire a data image of a portion of the slider surface which includes the pole tip;
(B) operating the AFM in the topographical imaging mode to acquire a reference image of a portion of the slider surface;
(C) subtracting the reference image from the data image thereby to obtain a corrected image of the pole tip; then
(D) taking a metrology measurement on the corrected image to obtain an indication of pole tip recession.

63. A method as defined in claim 62, further comprising generating and displaying a humanly-discernible signal indicative of pole tip recession.

64. A method as defined in claim 62, further comprising 1) creating a relative displacement between a probe of the AFM and the slider surface and 2) operating the AFM in a feature-locating mode so as to map variations in feature characteristics and to obtain an indication of the location on the slider surface of the pole tip.

65. A scanning probe microscope (SPM) comprising:
(A) a probe including a probe tip;
(B) an actuator assembly which effects relative movement between said probe tip and a sample,
(C) a detector which detects the magnitude of at least one parameter of the relative movement; and
(D) a controller which is electronically coupled to said actuator assembly and to said detector and which is operable, in conjunction with said actuator assembly and said detector, to
(1) acquire a data image of a portion of a sample which includes at least one feature of interest,
(2) acquire a reference image of a portion of the sample,
(3) subtract at least part of the reference image from at least part of the data image thereby to obtain a corrected image, and (4) operate the SPM in a feature-locating mode using magnetic force mode (MFM) so as to map variations in feature characteristics and to obtain an indication of the location on the sample of the feature of interest.

66. An SPM as defined in claim 65, wherein said actuator assembly comprises an XYZ actuator coupled to one of said probe and to a support for said sample.

67. An SPM as defined in claim 66, wherein said microscope is an atomic force microscope (AFM) in which said probe includes a cantilever which includes a base coupled to said actuator assembly and a free end on which said probe is mounted, and wherein said actuator assembly further comprises an oscillator coupled to said base of said cantilever.

68. An SPM as defined in claim 65, wherein said microscope is an atomic force microscope (AFM) in which said probe includes a cantilever which includes a base coupled to said actuator assembly and a free end on which said probe is mounted.

* * * * *